Aug. 7, 1934.  T. N. ADLAM  1,969,492
PRESSURE TEMPERATURE METHOD AND APPARATUS FOR THE CONTROL OF HEATING
Filed Nov. 8, 1930  4 Sheets-Sheet 1
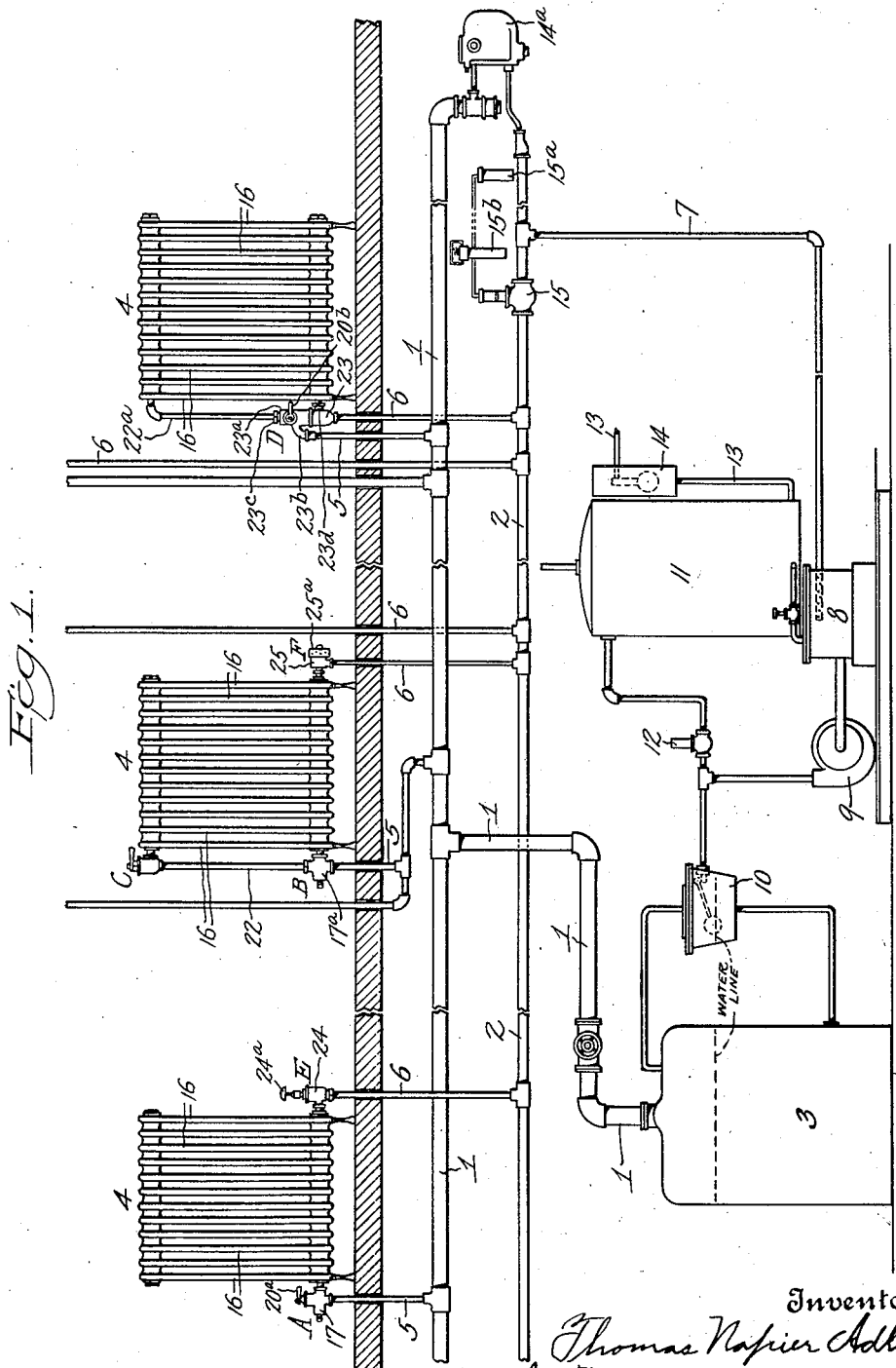
Inventor
Thomas Napier Adlam
By his Attorney
Lawrence K. Sager.

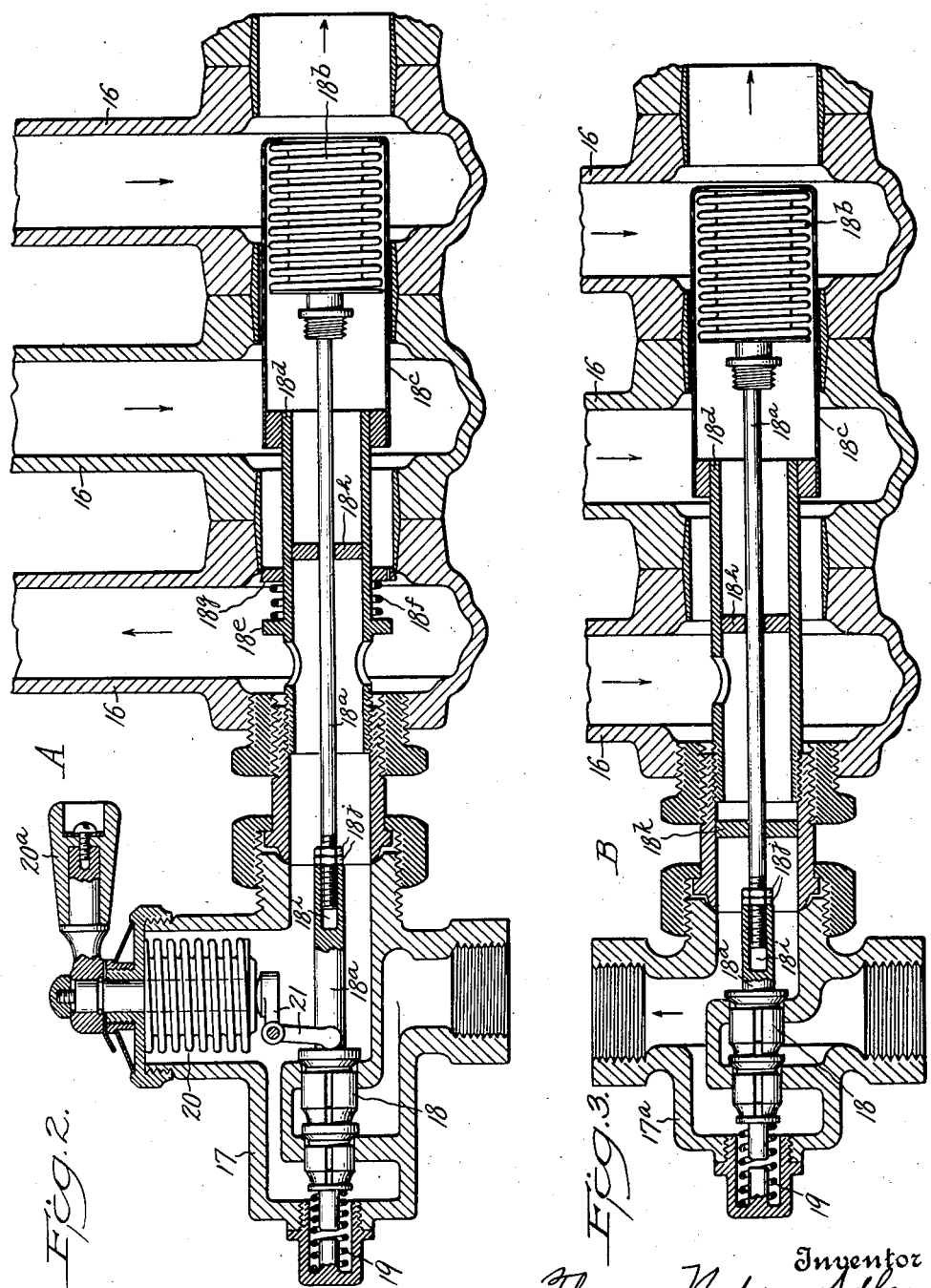

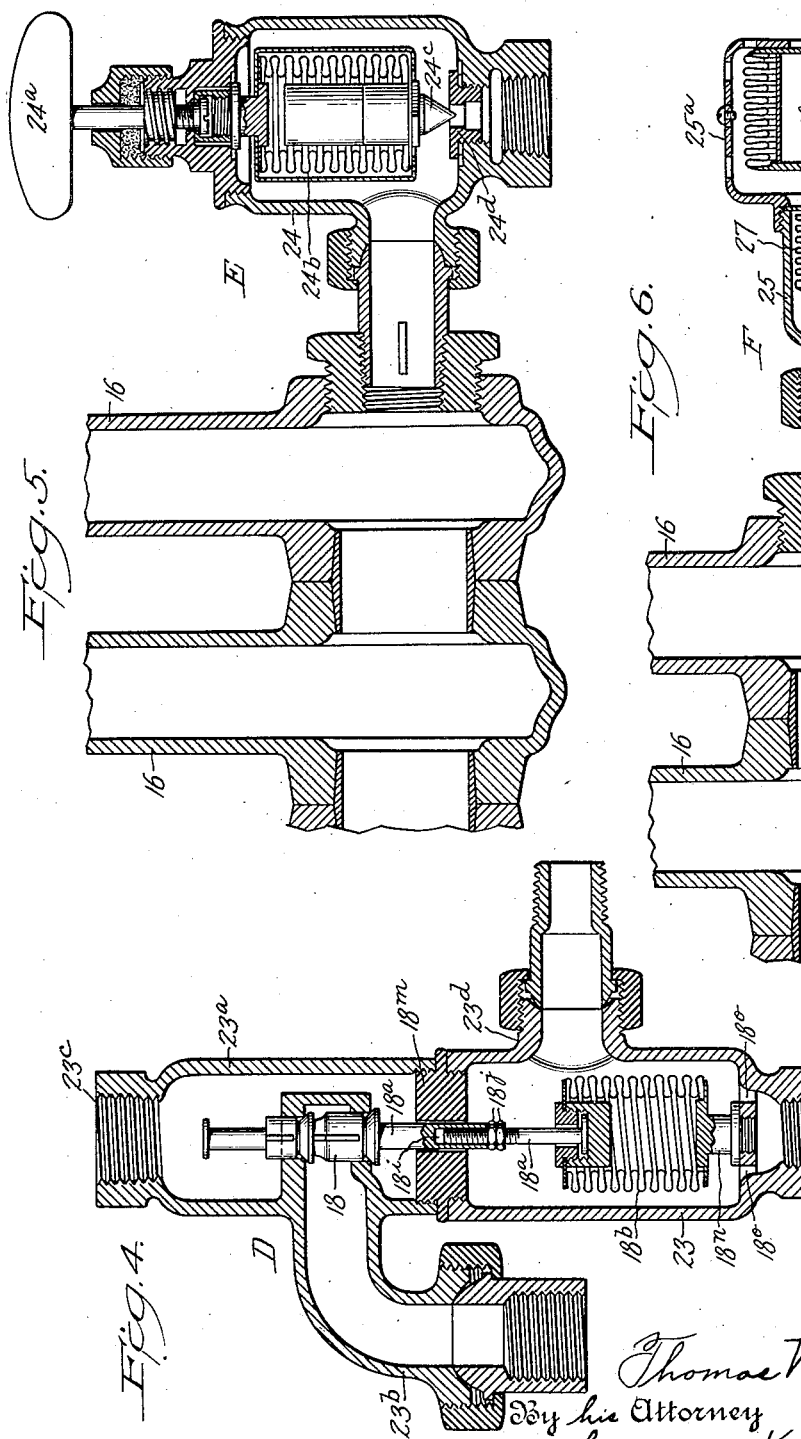

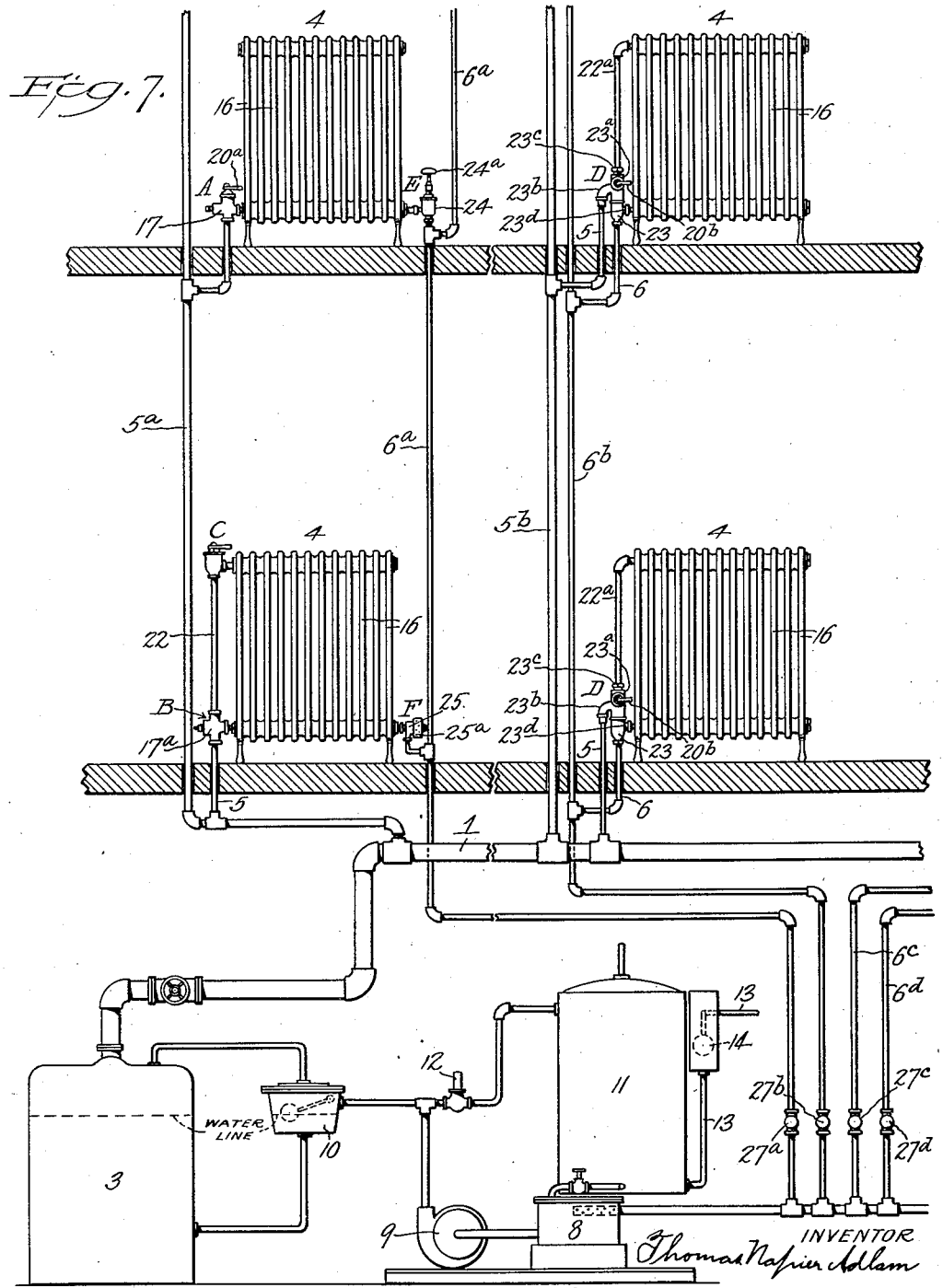

Patented Aug. 7, 1934

1,969,492

UNITED STATES PATENT OFFICE 1,969,492

PRESSURE TEMPERATURE METHOD AND APPARATUS FOR THE CONTROL OF HEATING

Thomas Napier Adlam, Bethlehem, Pa., assignor to Sarco Company, Inc., a corporation of New York Application November 8, 1930, Serial No. 494,307

19 Claims. (Cl. 236—37)

This invention relates to an improved method and apparatus for the control of heating; and although the invention is particularly applicable to steam heating systems for buildings, yet it is also generally applicable to various other purposes where it is desired to control the temperature and is applicable to any form of heating elements, other than radiators for heating a building. The control is accomplished automatically, but is also subject to manual control and adjustment. The invention also provides for control of the heating differently in different sections or zones of the system, according to particular conditions required.

The invention particularly relates to that type of heating system wherein the outlet pressure of the heating elements is varied for the purpose of changing the temperature of the heating elements, according to the temperatures desired, or to correspond with change in conditions, such as change in weather conditions. If the temperature required in the radiators, or heating elements, is comparatively high, then the outlet pressure is maintained comparatively high; and if the required temperature is low, the outlet pressure of the heating elements is made low, as by means of a vacuum pump, so as to impose any desired absolute outlet pressure. By such control of the outlet pressure, great economy is attained by avoiding unnecessary waste of heat and fuel, and likewise results in giving the proper temperature to the rooms and different parts of the building under change in weather conditions and in giving just the required amount of heat as may be desired for any particular purpose.

If it be attempted to control the heat given off from the heating elements by individual control of the outlets of the heating elements by closing or opening the outlet valves, then the advantage of the change of outlet pressure maintained on the system as a whole, or upon sections thereof, is lost. This is because the closing of the outlet valves on the individual heating elements, results in changing the temperature of the heating elements by reason of the change in the pressure therein. Likewise, it is no advantage, in such a system, to automatically control the inlet valves by changes in temperature alone, because such a control would be entirely independent of the change in outlet pressure imposed upon the system. By the present invention, however, I provide means for automatically controlling the inlet valves of the heating elements as determined by both the change in outlet pressure of the system and also by the temperature of the heating elements. Thereby the advantage of change in outlet pressure of the system is permitted to have the full desired effect upon the heating elements, while also securing the advantage of temperature control. In the present improvement, I have also combined various auxiliary controlling devices, all inter-related to each other, in such manner as to secure the particular results desired in different elements of the heating system and in different groups, or zones, of the heating elements, according to special heating requirements, difference in geographical locations and other factors which make it desirable to permit variations in different zones or even different heating elements of the same zone.

The main object of this invention is to provide an improved method and apparatus for the control of heating according to the particular conditions required and to change such conditions from time to time as they occur. Another important object is to attain economy in the supply and control of the heat energy with a view to lowering the cost of fuel required. Another object is to secure an equable temperature throughout the building heated by controlling the distribution of the heat energy according to the requirements in different parts thereof. Another object is to secure the control automatically and in a manner which will be highly sensitive and responsive to slight changes. Another object is to render the control independent of the initial pressure imparted to the system and independent of the size of the heating elements and connections between the parts. Another object is to permit a very wide range of control and variation in pressure and temperature so as to function efficiently and dependably under a wide variation of conditions. Another object is to provide controlling apparatus of an improved form and relationship of parts which will be dependable in long continued use. Various other objects and advantages of the invention will be understood from the following description and accompanying drawings which illustrate a preferred embodiment thereof.

Fig. 1 is a diagram showing one embodiment of my invention; Fig. 2 is a vertical cross-section showing one form of the pressure-temperature controlling element, as well as auxiliary means for manual control; Fig. 3 is a vertical cross-section showing another form of the pressure-temperature controlling element; Fig. 4 is a vertical cross-section showing another form thereof; Fig. 5 is a vertical cross-section showing one form of auxiliary control valve for the heating element outlet; Fig. 6 is a vertical cross-section showing another form of auxiliary control valve for the outlet; and Fig. 7 is a diagram showing in a general view another form of system and apparatus embodying my invention.

The layout of a system embodying my invention will, of course, depend upon the particular requirements of the building and of the number of heating elements and relative location, but for the sake of clearness, I have indicated in Fig. 1, a heating system with one main steam supply pipe 1 and one common return pipe 2. The boiler for supplying steam to the main pipe 1 is indicated at 3, although the main steam pipe may be connected to any central steam supply, or other source of heat energy. The radiators or heating elements 4 are located in different parts of the building as may be desired. They are connected to the main supply pipe by risers 5 and to the common return pipe by the individual return pipes 6. The intake to the left hand radiator 4 is controlled by a pressure-temperature valve generally designated by the letter A; the middle radiator 4 is controlled at its intake by a pressure-temperature valve generally designated by the letter B and by a manually adjustable valve designated by the letter C; and the right hand radiator 4 is controlled at its inlet by another form of pressure-temperature valve generally designated as D. The right hand radiator 4 is shown controlled at its outlet, although ordinarily it is unnecessary to provide any control at the outlet from the heating elements; but where desired such auxiliary control may be provided, and in the left hand radiator 4 the outlet is indicated as being controlled by a valve generally designated by the letter E, while the outlet of the middle radiator is shown as having an auxiliary control valve generally designated by the letter F.

The common return pipe 2 is connected by a pipe 7 through a mixing chamber 8, which in turn is connected to the intake of a vacuum pump 9. The discharge of the vacuum pump is connected to a device 10 of known form which automatically maintains the water level in the boiler at the required fixed amount. Pipes connect the upper and lower portions of the boiler and level maintainer in order to equalize the pressure therein and insure the same water level in each. Excess water is maintained in the reservoir 11 and passes therefrom through the mixing chamber 8, where it is mixed with and heated by the water discharged by the return pipe 7, before it is taken by the pump 9 for discharge to the boiler. The outlet from the pump 9 is also connected with the top of the reservoir 11 through a surplus pressure valve 12, which insures sufficient pressure being maintained in the pump discharge pipe for overcoming the pressure in the boiler and so permit the passage of water thereto as controlled by the water level device 10. An auxiliary supply pipe 13 is connected to the reservoir 11 for supplying water thereto as required in order to maintain a predetermined water level therein. This auxiliary supply of water is controlled through any suitable form of water level maintaining device 14. A trap 14a is shown connected between the main supply pipe and the main return pipe of the system for returning to the latter any condensate which may form in the supply connections.

In the main return pipe 2, is located a valve 15 of any suitable form for imposing any required absolute pressure upon the return pipe 2, as determined by variations in the controlling factor, such as in the temperature outside the building, temperature within some portion of the building, or at any selected controlling location. These pressure controlling valves in various forms are, in themselves, no part of my invention, and any suitable form may be used, but are preferably of the type where expansible liquid or vapor pressure is utilized to adjust the position of the valve in the return pipe. An example of such a regulator is that disclosed in the patent of Frank W. Roller 1,185,347, granted May 30, 1916. Of course, for the purpose of the present improvement, the valve in the main return will be a reverse acting valve instead of the type shown in the Roller patent; that is, an increase in temperature at the location selected for controlling the valve, should cause the valve to be adjusted to a more open position than before, so that the absolute pressure in the return pipe 2 will be lowered correspondingly, by permitting the vacuum pump to be more effective in exhausting the return portions of the system. In Fig. 1, the element 15a indicates the controlling element located at the point where the change of temperature is desired to affect the pressure in the return pipe and corresponds to the portion 1 of the said Roller patent. Likewise, the portion 15b corresponds to the protective adjustable means of the Roller patent.

Where I refer herein to the maintaining or imposing of different pressures in the return portions and in the radiators, or heating elements of the system, it will be understood that I am referring to absolute pressures which may be above or below atmospheric pressure, according to the automatically adjusted position of the controlling valve 15 and the action of the vacuum pump 9. Ordinarily, the pressure in the return portions of the system and within the heating elements will be below atmospheric pressure.

In a heating system of the character described, the controlling valves associated with the radiators, or heating elements, have an important functional relationship. The valves A, B and D of Fig. 1 serve to control the inlet of the heating fluid to the radiators, and the construction and relationship of these valves to the radiators are such that their action in the adjustment of the inlet valves depends upon the pressure of the fluid within or leaving the radiators, as determined by the absolute pressure on the return portions of the system. These inlet controlling valves are also dependent for their action upon the temperature of the fluid within or leaving the radiators. Thus, in controlling the admission of the heating fluid to the radiators, the action is dependent upon both the temperature and pressure of the fluid within or leaving the radiators. An increase in temperature tends to close the inlet valves and an increase in pressure within the radiators tends to open the inlet valves. Thus when the pressure of the return portion of the system is lowered, as determined by the position of the valve 15 and the action of the vacuum pump 9, the lowered pressure will tend to cause the inlet valves to close. Thus, regardless of the temperature factor in the control of the inlet valves, a lowered outlet pressure causes these valves to be controlled so that the temperature maintained in the radiators is lowered to correspond with the lowered outlet pressure. Thus, under conditions when the weather is comparatively warm, for example, the lower pressure imposed upon the return portions of the system results in the inlet valves being controlled to correspondingly lower the temperature and heating effect of the radiators. Thus, the inlet valves will automatically respond to the changes imposed upon the return portions of the system and maintain the required heating effect in the radiators, as long as the pressure in the return portion of the system continues unchanged.

The structure of these automatically acting inlet valves may be of various forms provided, however, that they are subject to the pressure and temperature of the fluid within, or leaving, the radiators.

Fig. 2 illustrates one form of inlet controlling valve, designated generally as valve A and shows the location of the temperature and pressure responding element within the lower portion of the radiator, for giving the desired controlling effects. The lower portion of a few sections 16 of the radiator is shown in Fig. 2; and the inlet valve is shown coupled to the lower left hand portion of the radiator. It is provided with a suitable housing 17 having suitable passages and a double seated balanced form of valve 18. The valve stem 18a extends from the movable element of the valve through and into the lower portion of the radiator, extending through the lower passage thereof. The inner end of the valve stem is connected to the movable end of an expansible and contractable element 18b preferably of the well known corrugated, or bellows, form, as indicated in Fig. 2. The expansible element 18b is hermetically sealed and contains a vapor or volatile liquid and exerts a variable pressure within this corrugated element according to the temperature thereof, which temperature is that of the heating fluid within the radiator. The inner end of the element 18b is secured to, and supported by, the inner end of a perforated metal cylinder 18c extending longitudinally through the lower passage of the radiator and in turn is supported by the inner end of a supporting tube 18d, which latter has a threaded and supporting engagement with the valve coupling. The tube 18d is provided with an outwardly projecting flange 18e within the first section of the radiator. This flange serves as a support for a spring 18f which encircles the tube 18d and forces a movable flange or ring 18g against one end of the lower passage between the first two radiator sections. This flange causes the incoming steam to pass upwardly in the first section of the radiator, and then downwardly in the other sections and out through the outlet passages, as indicated by the arrows in Fig. 2. Thus, the thermostatic element 18b is subjected to an external pressure which is the pressure of the fluid within, or passing out of, the radiator. It is similarly subjected to the temperature of the fluid within, or passing out of, the radiator. The tube 18d is provided with an inwardly projecting flange or ring 18h which serves as a guide and support for the valve stem 18a, the latter having a free sliding engagement with and passing through the middle portion of this ring.

The outer end of the valve housing contains a spring 19 which engages the outer end of the movable valve element and tends to open the valve against the pressure of the corrugated element 18b. It is evident that the control of the valve in its opening and closing and in assuming intermediate positions, is dependent upon the combined effect of the pressure and temperature within the radiator upon the corrugated element 18b in its action against the spring 19.

The inlet valve of Fig. 2 is also shown provided with auxiliary means for manually closing the inlet valve when desired. Thus the housing of the valve is provided with an upwardly extended portion in which is indicated a usual form of packless device 20, adjusted by the handle 20a. The inner end of this device engages one arm of a bell crank lever 21 which is pivotally supported by the valve housing. The other arm of the lever impinges upon the inner end of the movable valve element. Thus when the handle 20a is manually turned to force the bell crank lever in a clockwise direction, the valve will be manually closed against the action of the spring 19; and will be permitted to be opened by the spring 19 when the handle 20a is moved to open position. The valve stem 18a has an intermediate coupling which permits the left hand portion of the valve stem to move to the left without affecting the position of the right hand portion of the valve stem. Thus the left hand portion of the stem is provided with a central longitudinal opening 18i, in which the right hand portion of the stem is free to slide. Nuts 18j are carried by the right hand portion of the valve stem and serve as a stop when engaging the left hand portion of the valve stem.

Thus when the manually operated device is in open position, the inlet valve is subjected entirely to the automatic control, as already explained.

Fig. 3 shows the structure of the inlet valve generally indicated by the letter B in Fig. 1. Here the incoming steam, or heating fluid, instead of passing into the lower portion of the radiator, passes through a pipe 22, Fig. 1, to the top of the radiator. In this case, a separate modulating valve C is located at the top inlet for shutting off the steam manually when desired. The structure of the valve B, as shown in Fig. 3, has corresponding elements designated by the same reference characters as used in Fig. 2. In Fig. 3, the valve casing 17a is provided with an upper outlet adapted for connection with the pipe 22. A portion of the coupling to the lower part of the radiator is provided with an inwardly extending flange or ring 18k through which the valve stem passes and having a loose sliding fit therewith. This causes the incoming steam to pass upwardly through the pipe 22 to the top of the radiator and down through the radiator sections as indicated by the arrows in Fig. 3.

Fig. 4 shows the structure of the inlet valve and automatic control thereof where the same is housed and located as generally indicated by the letter D of Fig. 1. Here the thermostatic and pressure element is housed in a special body or casing 23 rigidly attached to the inlet valve body 23a. These casings are vertically located and the valve casing has a downwardly extending side inlet 23b adapted to be connected with a riser 5 supplying the heating fluid. The top portion of the valve casing is provided with an outlet 23c for connection with the pipe 22a which in turn connects with the top of the radiator. The casing enclosing the thermostatic and pressure element has a side portion 23d adapted to be coupled with the lower portion of the radiator to receive the condensate therefrom, which in turn passes out through the lower portion of the casing 23 and through a return 6. The plate 18m serves to rigidly connect the two casings and also serves as a guide for the valve stem 18a.

The corrugated element 18b is supported at its outside end, as shown in Fig. 4, by a base 18n which in turn is supported by arms 18o extending from the lower portion of the casing. The valve is biased to open, no opening spring being necessary in this form of valve. This valve may be provided with a manually operated device for closing the same when desired and of the form shown in Fig. 2, its location being indicated at 20b in Fig. 1 on the inlet valve casing. Instead of locating the manual controlling device at the inlet valve casing, it may be in the form of a shut-off valve located at the top of the pipe 22a, corresponding to the valve C of Fig. 1.

In all these forms of valves for controlling the inlet, the temperature of the radiators, or heating elements, is raised as the steam enters the same, until it reaches a temperature corresponding to the absolute pressure imposed upon the return portion of the system. When this condition is reached, the pressure temperature controlling element responds to the combined effect of the temperature and absolute pressure and closes the inlet valve and prevents further steam entering the radiators. This relation of temperature and pressure is maintained constant in a refined degree automatically by the opening and closing of the inlet valve and adjustment of its position, as long as the absolute pressure in the return portion of the system remains constant, as determined by the regulating valve 15. Should the temperature affecting the element 15a fall, the regulator immediately imposes a higher absolute pressure upon the return portion of the system and a correspondingly higher temperature in the heating elements. The reverse action takes place when the thermostatic element 15a is subjected to a higher temperature. Thus, a balance of temperature is automatically maintained in the heating elements of the system to insure satisfactory heating with no waste of heat, or unnecessary consumption of fuel.

In some cases, individual control of the radiators, or heating elements, may be desirable to maintain a temperature in one or more of the radiators above that of the others in the system. For this purpose, I introduce in the return connection of the radiator a thermostatic hand controlled element generally indicated by the letter E in Fig. 1, and whose structure is shown in Fig. 5. The casing 24 of this valve is coupled to the outlet of the radiator and connected with a return pipe 6. The turning of the handle 24a causes the corrugated element 24b to be raised, or lowered, and to adjust the movable valve element 24c in desired relation to the valve seat 24d. Usually, the corrugated element is kept in its upper position, so that it does not function at any time to close the outlet of the return pipe. When, however, a temperature is required above that imposed upon the system by the automatic control already described, the handle is operated to bring the corrugated element 24b into position to operate as a steam trap. The closing of the valve 24c, or the partial closing thereof, serves to prevent the transmission of the absolute pressure from the return line into the radiator. This allows the building up of a higher pressure in the radiator and permits the inlet valve to remain open, so that the temperature of the steam within the radiator may reach the inlet steam temperature. It is unnecessary to describe the detailed construction of this outlet valve, as it is a well-known form in itself for use as a steam trap valve.

In some cases, it may be desired to control an individual radiator automatically, according to the change in temperature of the room in which it is located. For this purpose, I superimpose upon the systems already described, an auxiliary automatic valve controlling device generally indicated by the letter F in Fig. 1, the construction of which is shown in Fig. 6.

Here a valve casing 25 is connected with the outlet of the radiator and also with a return pipe 6. An auxiliary perforated casing 25a is supported upon the casing 25 and encloses a corrugated thermostatic element 26. This element is hermetically sealed at its inner end to a movable plate 26a, and at its outer end to a fixed plate 26b. The plate 26a is connected by a rod or strip 26c to a correspondingly moved element 26d. This element carries a valve 26e adapted to close or partially close against its seat formed as a part of the valve casing. The connecting strip 26c passes freely through a plate 26f supported in fixed position by the valve casing. A corrugated element 27 is hermetically sealed at one end to this plate 26f and at the other end to the element 26d, thus forming a packless connection between the plate 26a and the movable element 26e of the valve.

The element 26 forms a thermostatic element which is subjected to the room temperature and whose expansion and contraction is determined thereby. Should the temperature of the room fall below that required, this element 26 will contract and draw the valve element 26e toward its seat to partially close, or in some cases fully close, this valve. This chokes the vacuum, or absolute pressure, acting on the return portion of the radiator and by increasing the pressure in the radiator, allows the temperature therein to rise, thus giving more heat to the particular room where this auxiliary automatic control is used. This automatic control may be of any particular shape or design; and instead of mounting the expansible and contracting element 26, or corresponding controlling element, directly upon the outlet valve casing, it may be located on the wall, or at some distant point with suitable means for transmitting its action to the valve controlling the outlet of the radiator.

Fig. 7 indicates a system embodying my invention wherein the heating units are divided into zones, or groups, to suit the special uses, or allocation of the rooms, their location geographically and the like. The heating elements of each zone are connected to individual returns, a separate return being respectively provided for each zone. Each return may, therefore, be subjected to any desired absolute pressure different from that of the others, to suit the particular heating requirements of the zone served thereby.

The parts shown in Fig. 7, corresponding to those shown in Fig. 1, are similarly numbered and lettered; but in Fig. 7, the two left hand radiators are part of one zone supplied by the riser 5a and connected to a common return 6a. The two right hand radiators form part of another zone and are supplied by the riser 5b and have a common return 6b. These returns all finally lead to the mixing chamber 8, but the return 6a is provided with its own automatically controlled or adjustable pressure regulating valve 27a of any suitable form, such as that of the above referred to Roller patent. The return 6b is similarly provided with its own pressure controlling valve 27b; and Fig. 7 also indicates other returns 6c and 6d provided with their pressure regulating valves 27c and 27d. These pressure regulating valves may have their thermostatic controlling elements in different locations and subjected to different temperature conditions for giving the results desired. They may be subjected to the same outside temperature, or the same inside temperature and manually adjusted differently for maintaining desired respective different absolute pressures. Thus, by my improvement, the temperatures of the radiators in the different zones, or groups, will automatically be controlled to maintain the desired different temperatures in the different zones and vary these temperatures according to weather conditions, or other desired control affecting the returns of the different zones.

It is apparent that my improvement permits great flexibility in many different arrangements and relationships to suit the requirements of any particular installation. It will also be understood that my invention is capable of application to various purposes other than the heating of rooms of buildings, and that the heating units instead of being the usual radiators, may be of any form desired and applied in any desired locations according to the particular purpose and character of use. Also, although I have shown and described preferred embodiments of my invention, it will be understood that the same may be modified without departing from the scope thereof.

I claim:

1. The combination with a heating element of an inlet valve, automatic means responsive to change of the temperature and pressure within said element for controlling said inlet valve, and means for automatically varying the outlet pressure imposed upon said element, said last named means being responsive to temperature changes at a distant location.

2. The combination of a plurality of heating elements, an inlet valve for each of said elements, a common return for said elements, means related to said return for automatically controlling the absolute pressure in said return, said means being responsive to changes in the outside temperature, and a device for each of said elements respectively for automatically controlling said inlet valves, said devices being responsive to change of the temperature of their respective elements and to change in pressure imposed upon said return.

3. The method of controlling the temperature of a heating element which comprises controlling the incoming heating fluid according to change of the temperature and pressure within the heating element, and varying the outlet pressure imposed upon said heating element according to external temperature conditions.

4. The method of controlling the temperature of a plurality of heating elements which comprises varying the outlet pressure upon said elements as a group according to the change in temperature at a distant location, and individually controlling the incoming heating fluid to said elements according to change of the temperature and pressure within said elements respectively.

5. The method of controlling the temperature of a plurality of heating elements which comprises varying the outlet pressure upon said elements as a group, individually controlling the incoming heating fluid to said elements according to change of the temperature and pressure within said elements respectively, and individually modifying the outlet pressures upon said heating elements, according to external temperature conditions.

6. The combination with a heating element of an inlet valve, said element having an outlet for the discharge of the heating fluid, automatic means comprising a single element responsive to change of temperature of the outgoing heating fluid and to change of the outlet pressure imposed upon said first named element for adjusting said inlet valve to varying amounts of closure as determined by the combined effects of said temperature and pressure, and means for automatically adjusting the pressure imposed upon said outlet to different amounts according to change of temperature at a selected location.

7. The combination with a heating element of an inlet valve, said element having an outlet for the discharge of the heating fluid, automatic means responsive to change of pressure within said element and tending to open said valve with increase of pressure and responsive to change of temperature within said element and tending to close said valve with increase of temperature and thereby adjust said inlet valve to varying amounts of closure as determined by the combined effects of said pressure and temperature, and means for automatically adjusting the pressure imposed upon said outlet to different amounts according to change of temperature at a selected location.

8. The combination with a heating element of an inlet valve, said element having an outlet for the discharge of the heating fluid, automatic means responsive to change of temperature and pressure within said element for adjusting said inlet valve to varying amounts of closure as determined by the combined effects of said temperature and pressure, and means for varying the outlet pressure imposed upon said element according to change of conditions external to said element.

9. The combination with a heating element of an inlet valve, said element having an outlet for the discharge of the heating fluid, automatic means responsive to change of the temperature of the outgoing heating fluid and to change of the outlet pressure upon said element for adjusting said inlet valve to varying amounts of closure as determined by the combined effects of said temperature and pressure, and means for varying the outlet pressure imposed upon said element according to change of conditions external to said element.

10. The combination of a plurality of groups of heating elements, a return for each of said groups respectively, means for automatically maintaining different pressures in the returns of the different groups respectively, an inlet valve for each of said elements, and a device for respectively adjusting each of said valves automatically to varying amounts of closure, said device being responsive to change of the temperature and outlet pressure upon said elements respectively.

11. The combination of a plurality of heating elements, an inlet valve for each of said elements, a common return for said elements, means related to said return for automatically varying the absolute pressure in said return to correspond to different conditions, and a device for each of said elements respectively for automatically adjusting said inlet valves to varying amounts of closure, said devices being responsive to change of the temperature of their respective elements and to change in pressure imposed upon said return.

12. The combination of a plurality of heating elements, a common return for said elements, means for varying the absolute pressure imposed upon said return to correspond with different conditions, means responsive to change of the temperature and pressure within said elements for respectively adjusting said inlet valves to varying amounts of closure as determined by the combined effects of said temperature and pressure, and means for individually controlling the outlets of said elements for affecting the pressure therein and responsive to changes outside said elements respectively.

13. The combination of a plurality of heating elements, an inlet valve for each of said elements, a common return for said elements, means for varying the absolute pressure imposed upon said return to correspond to different conditions, means responsive to change of the temperature and pressure within said elements for respectively adjusting said inlet valves to varying amounts of closure as determined by the combined effects of said temperature and pressure and automatic means responsive to temperatures outside said units for individually controlling the outlets of said elements for affecting the pressure therein.

14. The method of controlling the temperature of a heating element having an inlet and outlet for the passage of the heating fluid which comprises varying the pressure imposed upon the outlet according to change of temperature at a selected location, and controlling the incoming heating fluid in varying degree according to the change of the temperature of the heating fluid and change of pressure imposed upon the outlet of the heating element.

15. The method of controlling the temperature of a plurality of heating elements which comprises varying the outlet pressure upon said elements as a group according to change of temperature at a selected location, and individually controlling the incoming heating fluid to said elements in varying degree according to change of the temperature of the heating fluid within said elements respectively and according to change of the outlet pressure imposed upon said elements.

16. The method of controlling the temperature of a plurality of heating elements which comprises varying the outlet pressure upon said elements as a group, individually controlling the incoming heating fluid to said elements in varying degree according to change of the temperature within said elements respectively and according to the change of outlet pressure imposed upon said elements, and individually modifying the outlet pressures upon said heating elements according to the temperature outside said elements.

17. The method of controlling the temperature of a plurality of groups of heating elements which comprises imposing different outlet pressures upon the groups of heating elements respectively according to change of temperature at different selected locations, and controlling the incoming heating fluid to the heating elements respectively in varying degree according to change of the temperature within the individual heating elements and according to change of the outlet pressure imposed upon the different groups respectively.

18. The combination with a heating element of an inlet valve, said element having an outlet for the discharge of the heating fluid, automatic means responsive to change of outlet pressure imposed upon said heating element for adjusting said valve to varying positions of closure as determined by said pressure, and means for automatically adjusting the pressure imposed upon said outlet to different amounts according to change of temperature at a selected location.

19. The combination of a plurality of groups of heating elements, a return for each of said groups respectively, means for automatically maintaining different pressures in the returns of the different groups according to change of temperature at different selected locations respectively, an inlet valve for each of said elements, and a device for respectively adjusting each of said valves automatically to varying amounts of closure, said device being responsive to change of outlet pressure imposed upon said elements respectively.

THOMAS NAPIER ADLAM.